US012174731B2

(12) United States Patent
Hiremath et al.

(10) Patent No.: US 12,174,731 B2
(45) Date of Patent: Dec. 24, 2024

(54) METHOD AND SYSTEM FOR AN AUTOMATED VIRTUAL ASSISTANT TESTING FRAMEWORK

(71) Applicant: JPMorgan Chase Bank, N.A., New York, NY (US)

(72) Inventors: Shreyas Hiremath, Bengaluru (IN); Raghava Krishna Gorantla Satyanarayana, Bangalore (IN); Vrushank Vijayakumar, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 160 days.

(21) Appl. No.: 17/874,674

(22) Filed: Jul. 27, 2022

(65) Prior Publication Data
US 2023/0393965 A1 Dec. 7, 2023

(30) Foreign Application Priority Data
Jun. 7, 2022 (IN) .............................. 202211032540

(51) Int. Cl.
*G06F 11/36* (2006.01)
(52) U.S. Cl.
CPC ...... *G06F 11/3688* (2013.01); *G06F 11/3684* (2013.01); *G06F 11/3692* (2013.01)
(58) Field of Classification Search
CPC ............. G06F 11/3688; G06F 11/3684; G06F 11/3692
See application file for complete search history.

(56) References Cited

U.S. PATENT DOCUMENTS

| 11,500,763 B1* | 11/2022 | Petrescu | G06F 11/3692 |
| 11,650,834 B1* | 5/2023 | Varada | G06F 9/453 |
| | | | 717/104 |
| 11,829,280 B1* | 11/2023 | Zhang | G06F 11/3684 |
| 2015/0135158 A1* | 5/2015 | Tenev | G06F 11/3684 |
| | | | 717/101 |
| 2018/0095869 A1* | 4/2018 | Peer | G06F 11/3664 |
| 2019/0129712 A1* | 5/2019 | Hawrylo | G06F 8/20 |
| 2021/0248058 A1* | 8/2021 | Hattingh | G06F 11/3664 |
| 2021/0334384 A1* | 10/2021 | Ranjan | G06F 21/6227 |
| 2022/0398186 A1* | 12/2022 | Mudumba | G06F 16/254 |

* cited by examiner

*Primary Examiner* — Phillip H Nguyen
(74) *Attorney, Agent, or Firm* — GREENBLUM & BERNSTEIN, P.L.C.

(57) ABSTRACT

A method for providing an automated virtual assistant testing framework to test one or more components associated with a virtual assistant (VA) is disclosed. The method includes integrating, one or more VA test suites with a continuous integration and continuous deployment (CICD) pipeline, wherein the one or more VA test suites comprises test case(s); receiving in a repository, a commit command; triggering, the CICD pipeline based on the commit command; executing, the one or more VA test suites based on the triggering of the CICD pipeline; and testing, the one or more components associated with the VA using a VA skills and intent training data, wherein the one or more components comprises custom UI(s), skill(s), integration(s) and/or one or more natural language processing (NLP) capabilities, and wherein the testing is based on the execution of the one or more virtual assistant (VA) test suites.

17 Claims, 5 Drawing Sheets

METHOD AND SYSTEM FOR AN AUTOMATED VIRTUAL ASSISTANT TESTING FRAMEWORK

CROSS-REFERENCE TO RELATED APPLICATIONS

This application claims the benefit of priority from Indian Patent Application No. 202211032540, filed on Jun. 7, 2022, which is herein incorporated by reference in its entirety.

BACKGROUND

Field of the Disclosure

This technology generally relates to methods and systems for an automated virtual assistant (VA) testing framework, and more particularly to methods and systems for providing an automated VA testing framework to test components associated with a VA based on the execution of one or more VA test suites.

Background Information

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

A Virtual Assistant (VA) works to assist its users with various tasks. In order to assist the users with various tasks, various components associated with the VA work together or independently. The components associated with the VA may include but not limited to various skills, natural language capabilities, user interfaces and web integrations, etc. To provide seamless VA services, various factors such as development, test, release, and management of the components associated with the VA are important. Most of the conventional tools mainly support UI or Chatbot testing and not VA component testing. However, the conventional tools that exist for testing the components associated with the VA generally require a significant amount of manual effort. In addition, some vendor specific VA testing tools exist in the art but they have many limitations.

One drawback of using conventional testing frameworks such as, for example, vendor specific VA testing tools is that in many instances, facilities such as custom user interface (UI) change validations, end to end (e2e) testing, UI components testing, etc. are not provided in these vendor specific VA testing tools and therefore in such instances it is not possible to efficiently test a VA in a comprehensive manner. Also, these vendor specific VA testing tools are limited to some specific VAs. Further, the currently known solutions of a VA testing include lengthy iterations of skills testing and presently there is no VA testing solution that can detect potential production bugs at early stages. In addition, for a VA testing currently there is no or low e2e regression testing including custom UI validations. Furthermore, the conventional testing frameworks lack the APIs health check status tests and the conventional testing frameworks cannot be integrated with CI/CD pipelines at least during deployment of skills to further allow or restrict the deployment based on quality gates. In addition to these drawbacks conventional testing frameworks also fail to support mock ability of APIs and are not integrated with mock servers.

Therefore, there is a need for a specialized approach that can overcome at least the above mentioned limitations by providing an automated VA testing framework for testing of the components associated with the VAs.

SUMMARY

The present disclosure, through one or more of its various aspects, embodiments, and/or specific features or sub-components, provides, inter alia, various systems, servers, devices, methods, media, programs, and platforms for providing an automated VA testing framework to test one or more components associated with a VA based on an execution of one or more VA test suites.

According to an aspect of the present disclosure, a method for providing an automated VA testing framework to test one or more components associated with a VA is disclosed. The method is implemented by at least one processor. The method may include integrating, by the at least one processor, one or more virtual assistant (VA) test suites with a continuous integration and continuous deployment pipeline, wherein each VA test suite of the one or more VA test suites comprises one or more test cases; receiving in a repository, by the at least one processor, a commit command; triggering, by the at least one processor, the continuous integration and continuous deployment pipeline based on the commit command; executing, by the at least one processor, the one or more virtual assistant (VA) test suites based on the triggering of the continuous integration and continuous deployment pipeline; and testing, by the at least one processor, the one or more components associated with the VA using a VA skills and intent training data, wherein the one or more components comprises at least one of one or more custom UIs, one or more skills, one or more integrations and one or more natural language processing (NLP) capabilities, and the testing is based on the execution of the one or more virtual assistant (VA) test suites.

In accordance with an exemplary embodiment, the method may further include generating, by the at least one processor, a test case execution report based on the testing.

In accordance with an exemplary embodiment, the method may further include determining, by the at least one processor, a quality score associated with the test case execution report; and deploying, by the at least one processor, the one or more components based on the quality score and a pre-defined quality threshold.

In accordance with an exemplary embodiment, the testing of the one or more integrations further comprises testing, by the at least one processor, the one or more integrations using at least one of a live API endpoint and a Mock API endpoint.

In accordance with an exemplary embodiment, the testing includes one of a browser based testing and a browser less testing.

In accordance with an exemplary embodiment, the testing further includes a parallel execution of a plurality of test cases for the one or more components associated with the VA.

In accordance with an exemplary embodiment, the testing further includes testing during at least one of a development phase, a quality assurance (QA) phase, a regression phase and a user acceptance testing (UAT) phase.

In accordance with an exemplary embodiment, the method may further include integrating, by the at least one processor, the Mock API endpoint to the automated virtual assistant testing framework to perform the testing using the integrated Mock API endpoint.

In accordance with an exemplary embodiment, the testing further comprises performing, by the at least one processor, at least one of a unit testing and an integration testing during at least one of the development phase, the QA phase, the regression phase, and the UAT phase.

In accordance with an exemplary embodiment, the method may further include automatically capturing, by the at least one processor, a media to generate a record of the testing, wherein the media is one of an image and a video of the execution of the one or more VA test suites.

In accordance with an exemplary embodiment, the one or more natural language processing (NLP) capabilities further includes at least one of one or more intents and one or more entities.

In accordance with an exemplary embodiment, the testing further includes testing based on one or more standard guidelines, behavior of an NLP, and/or the accessibility of the chat user interface etc.

According to an aspect of the present disclosure, a computing device configured to implement an execution of a method for providing an automated virtual assistant testing framework to test one or more components associated with a virtual assistant (VA) is provided. The computing device comprising a processor; a memory; and a communication interface coupled to each of the processor and the memory, wherein the processor may be configured to: integrate, one or more virtual assistant (VA) test suites with a continuous integration and continuous deployment pipeline, wherein the one or more VA test suites comprises one or more test cases; receive in a repository, a commit command; trigger, the continuous integration and continuous deployment pipeline based on the commit command; execute, the one or more virtual assistant (VA) test suites based on the triggering of the continuous integration and continuous deployment pipeline; and test, the one or more components associated with the VA using a VA skills and intent training data, wherein the one or more components comprises at least one of one or more custom UIs, one or more skills, one or more integrations and one or more natural language processing (NLP) capabilities, and the testing is based on the execution of the one or more virtual assistant (VA) test suites.

In accordance with an exemplary embodiment, the processor is further configured to generate, a test case execution report based on the testing.

In accordance with an exemplary embodiment, the processor is further configured to determine, a quality score associated with the test case execution report; and deploy the one or more components based on the quality score and a pre-defined quality threshold.

In accordance with an exemplary embodiment, to test the one or more integrations, the processor is further configured to test, the one or more integrations using at least one of a live API endpoint and a Mock API endpoint.

In accordance with an exemplary embodiment, the test includes one of a browser based test and a browser less test.

In accordance with an exemplary embodiment, the testing further includes a parallel execution of a plurality of test cases for the one or more components associated with the VA.

In accordance with an exemplary embodiment, the testing further includes testing during at least one of a development phase, a quality assurance (QA) phase, a regression phase and a user acceptance testing (UAT) phase.

In accordance with an exemplary embodiment, the processor is further configured to integrate, the Mock API endpoint to the automated virtual assistant testing framework to perform the testing using the integrated Mock API endpoint.

In accordance with an exemplary embodiment, the testing the processor is further configured to perform at least one of a unit testing and an integration testing during at least one of the development phase, the QA phase, the regression phase, and the UAT phase.

In accordance with an exemplary embodiment, the processor is further configured to automatically capture, a media to generate a record of the testing, wherein the media is one of an image and a video of the execution of the one or more VA test suites.

In accordance with an exemplary embodiment, the one or more natural language processing (NLP) capabilities further includes at least one of one or more intents and one or more entities.

In accordance with an exemplary embodiment, the testing further includes testing based on one or more standard guidelines, behavior of an NLP, and/or the accessibility of the chat user interface etc.

According to an aspect of the present disclosure, a non-transitory computer readable medium configured to store instructions for providing an automated virtual assistant testing framework to test one or more components associated with a virtual assistant (VA) is disclosed. The instructions, when executed, may cause a processor to perform the following: integrating one or more virtual assistant (VA) test suites with a continuous integration and continuous deployment pipeline, wherein the one or more VA test suites comprises one or more test cases; receiving in a repository, a commit command; triggering the continuous integration and continuous deployment pipeline based on the commit command; executing the one or more virtual assistant (VA) test suites based on the triggering of the continuous integration and continuous deployment pipeline; and testing the one or more components associated with the VA using a VA skills and intent training data, wherein the one or more components comprises at least one of one or more custom UIs, one or more skills, one or more integrations and one or more natural language processing (NLP) capabilities, and the testing is based on the execution of the one or more virtual assistant (VA) test suites.

In accordance with an exemplary embodiment, wherein, when executed, the instructions cause the processor to perform the following: generating a test case execution report based on the testing.

In accordance with an exemplary embodiment, wherein, when executed, the instructions cause the processor to perform the following: determining a quality score associated with the test case execution report; and deploying the one or more components based on the quality score and a pre-defined quality threshold.

In accordance with an exemplary embodiment, wherein, for the testing of the one or more integrations, when executed, the instructions further cause the processor to perform the following: testing, the one or more integrations using at least one of a live API endpoint and a Mock API endpoint.

In accordance with an exemplary embodiment, wherein the testing includes one of a browser based testing and a browser less testing.

In accordance with an exemplary embodiment, wherein the testing further includes a parallel execution of a plurality of test cases for the one or more components associated with the VA.

In accordance with an exemplary embodiment, wherein the testing further includes testing during at least one of a development phase, a quality assurance (QA) phase, a regression phase and a user acceptance testing (UAT) phase.

In accordance with an exemplary embodiment, wherein, when executed, the instructions cause the processor to perform the following: integrating the Mock API endpoint to the automated virtual assistant testing framework to perform the testing using the integrated Mock API endpoint.

In accordance with an exemplary embodiment, wherein, for the testing, when executed, the instructions further cause the processor to perform the following: performing at least one of a unit testing and an integration testing during at least one of the development phase, the QA phase, the regression phase, and the UAT phase.

In accordance with an exemplary embodiment, wherein, when executed, the instructions cause the processor to perform the following: automatically capturing, a media to generate a record of the testing, wherein the media is one of an image and a video of the execution of the one or more VA test suites.

In accordance with an exemplary embodiment, wherein the one or more natural language processing (NLP) capabilities further includes at least one of one or more intents and one or more entities.

In accordance with an exemplary embodiment, wherein the testing further includes testing based on one or more standard guidelines, behavior of an NLP, and/or the accessibility of the chat user interface etc.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
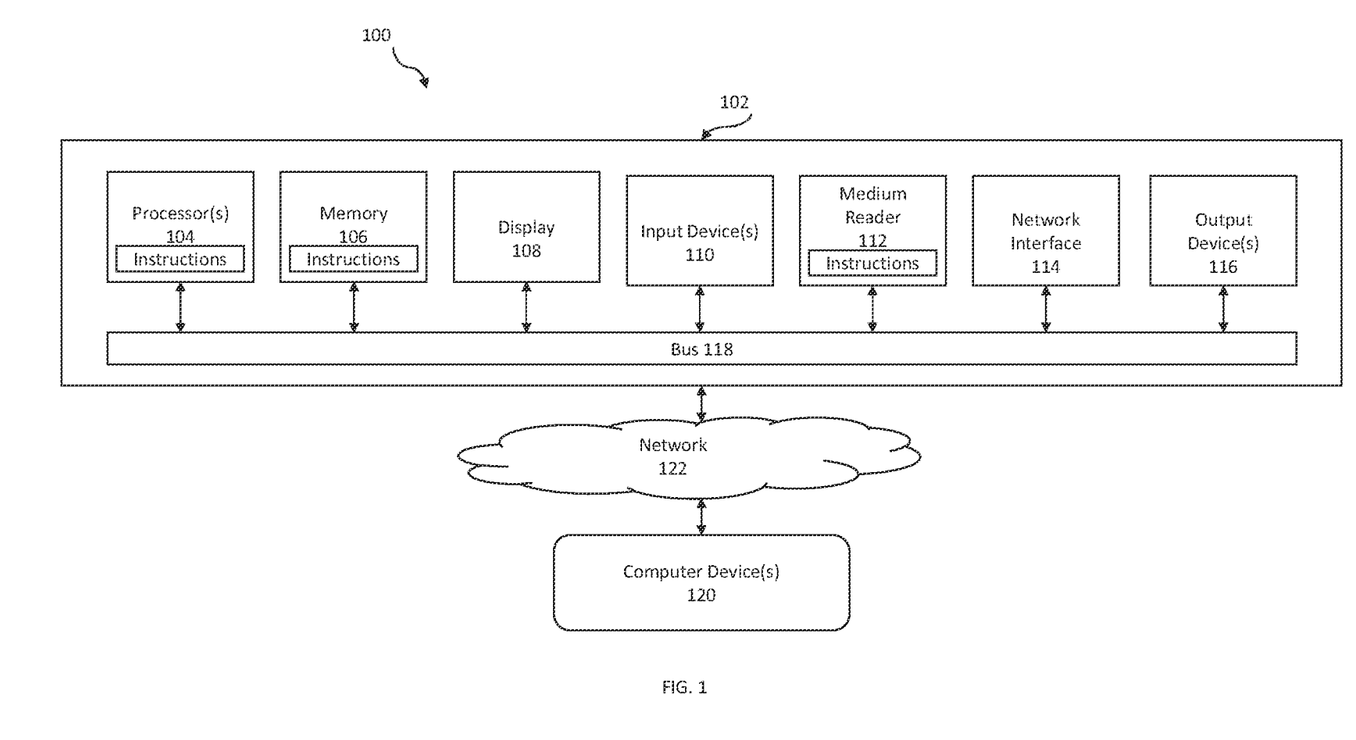
FIG. 1 illustrates an exemplary computer system for providing an automated virtual assistant testing framework to test one or more components associated with a virtual assistant (VA) in accordance with an exemplary embodiment.

FIG. 1 is an exemplary system for use in accordance with the embodiments described herein. The system 100 is generally shown and may include a computer system 102, also known as computing device 102, which is generally indicated to provide an automated virtual assistant testing framework to test one or more components associated with a virtual assistant (VA) in accordance with an exemplary embodiment.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an automated VA testing framework to test one or more components associated with a VA based on an execution of one or more VA test suites.

Figure 2:
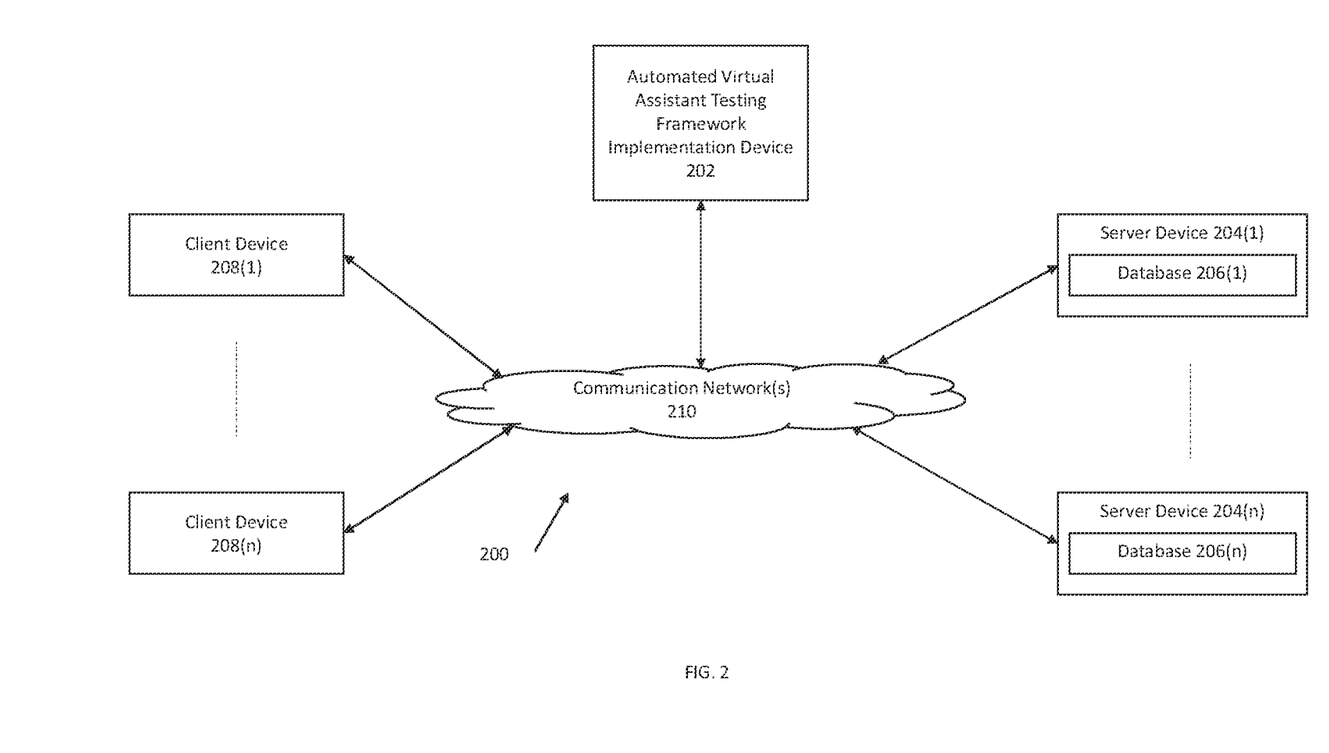
FIG. 2 illustrates an exemplary diagram of a network environment with an automated virtual assistant testing framework to test one or more components associated with a virtual assistant (VA) in accordance with an exemplary embodiment.

Referring to FIG. 2, a schematic of an exemplary network environment 200 for implementing a method for providing an automated virtual assistant testing framework to test one or more components associated with a virtual assistant (VA) is illustrated in accordance with an exemplary embodiment. In an exemplary embodiment, the method is executable on any networked computer platform, such as, for example, a personal computer (PC).

The method for providing an automated VA testing framework to test one or more components associated with the virtual assistant (VA) may be implemented by an Automated Virtual Assistant Testing Framework Implementation (AVATFI) device 202. The AVATFI device 202 may be the same or similar to the computer system 102 as described with respect to FIG. 1. The AVATFI device 202 may store one or more applications that can include executable instructions that, when executed by the AVATFI device 202, cause the AVATFI device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AVATFI device 202 itself, may be located in virtual server(s) running in a cloud-based computing environment rather than being tied to one or more specific physical network computing devices. Also, the application(s) may be running in one or more virtual machines (VMs) executing on the AVATFI device 202. Additionally, in one or more embodiments of this technology, virtual machine(s) running on the AVATFI device 202 may be managed or supervised by a hypervisor.

In the network environment 200 of FIG. 2, the AVATFI device 202 is coupled to a plurality of server devices 204(1)-204(n) that hosts a plurality of databases 206(1)-206(n), and also to a plurality of client devices 208(1)-208(n) via communication network(s) 210. A communication interface of the AVATFI device 202, such as the network interface 114 of the computer system 102 of FIG. 1, operatively couples and communicates between the AVATFI device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AVATFI device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and AVATFI devices that efficiently implement a method for providing an automated virtual assistant testing framework to test one or more components associated with a virtual assistant (VA), the method being implemented by at least one processor.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AVATFI device 202 may be a standalone device or integrated with one or more other devices or apparatuses, such as one or more of the server devices 204(1)-204(n), for example. In one particular example, the AVATFI device 202 may include or be hosted by one of the server devices 204(1)-204(n), and other arrangements are also possible. Moreover, one or more of the devices of the AVATFI device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AVATFI device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store a virtual assistant (VA) skills and intent training data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the AVATFI device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the AVATFI device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the AVATFI device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AVATFI device 202, the server devices 204(1)-204(n), or the client devices 208(1)-208(n), for example, may be configured to operate as virtual instances on the same physical machine. In other words, one or more of the AVATFI device 202, the server devices 204(1)-204(n), or the client devices 208(1)-208(n) may operate on the same physical device rather than as separate devices communicating through communication network(s) 210. Additionally, there may be more or fewer AVATFI devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
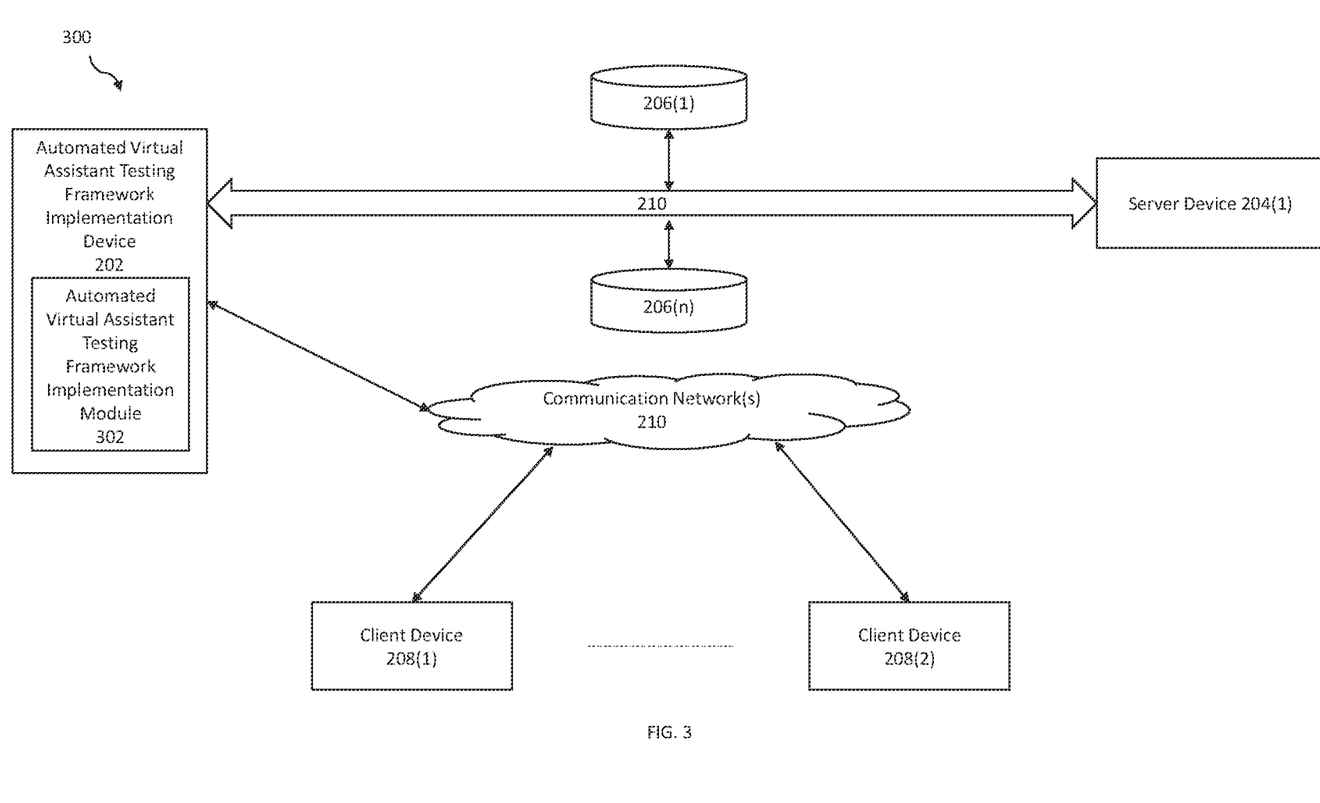
FIG. 3 shows an exemplary system for implementing a method for providing an automated virtual assistant testing framework to test one or more components associated with a virtual assistant (VA) based on an execution of one or more virtual assistant (VA) test suites, in accordance with an exemplary embodiment.

FIG. 3 illustrates an exemplary system for implementing a method for providing an automated virtual assistant testing framework to test one or more components associated with a virtual assistant (VA) based on an execution of one or more virtual assistant (VA) test suites, in accordance with an exemplary embodiment. As illustrated in FIG. 3, according to exemplary embodiments, the system 300 may comprise an AVATFI device 202 including an AVATFI module 302 that may be connected to a server device 204(1) and one or more repository 206(1) . . . 206(n) (i.e., Bit Bucket, but the disclosure is not limited thereto) via a communication network 210, but the disclosure is not limited thereto.

The AVATFI device 202 is described and shown in FIG. 3 as including the automated VA testing framework implementation (AVATFI) module 302, although it may include other rules, policies, modules, databases, or applications, for example. As will be described below, the automated VA testing framework implementation module 302 is configured to implement a method for providing an automated virtual assistant testing framework to test one or more components associated with a virtual assistant (VA).

An exemplary process 300 for implementing a mechanism for providing an automated virtual assistant testing framework to test one or more components associated with a virtual assistant (VA) based on an execution of one or more virtual assistant (VA) test suites by utilizing the network environment of FIG. 2 is shown as being executed in FIG. 3. Specifically, a first client device 208(1) and a second client device 208(2) are illustrated as being in communication with AVATFI device 202. In this regard, the first client device 208(1) and the second client device 208(2) may be "clients" of the AVATFI device 202 and are described herein as such. Nevertheless, it is to be known and understood that the first client device 208(1) and/or the second client device 208(2) need not necessarily be "clients" of the AVATFI device 202, or any entity described in association therewith herein. Any additional or alternative relationship may exist between either or both of the first client device 208(1) and the second client device 208(2) and the AVATFI device 202, or no relationship may exist.

Further, AVATFI device 202 is illustrated as being able to access the one or more repositories 206(1) . . . 206(n). The automated VA testing framework implementation module 302 may be configured to access these repositories/databases for implementing a method for providing an automated VA testing framework to test one or more components associated with a virtual assistant (VA) based on an execution of one or more virtual assistant (VA) test suites.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the AVATFI device 202 via broadband or cellular communication. Of course, these embodiments are merely exemplary and are not limiting or exhaustive.

Upon being started, the automated VA testing framework implementation module 302 executes a process for providing an automated VA testing framework to test one or more components associated with a virtual assistant (VA) based on an execution of one or more virtual assistant (VA) test suites. An exemplary process for implementing a method for providing an automated virtual assistant testing framework to test one or more components associated with a virtual assistant (VA) based on an execution of one or more virtual assistant (VA) test suites, in accordance with an exemplary embodiment is generally indicated at flowchart 400 in FIG. 4.

Figure 4:
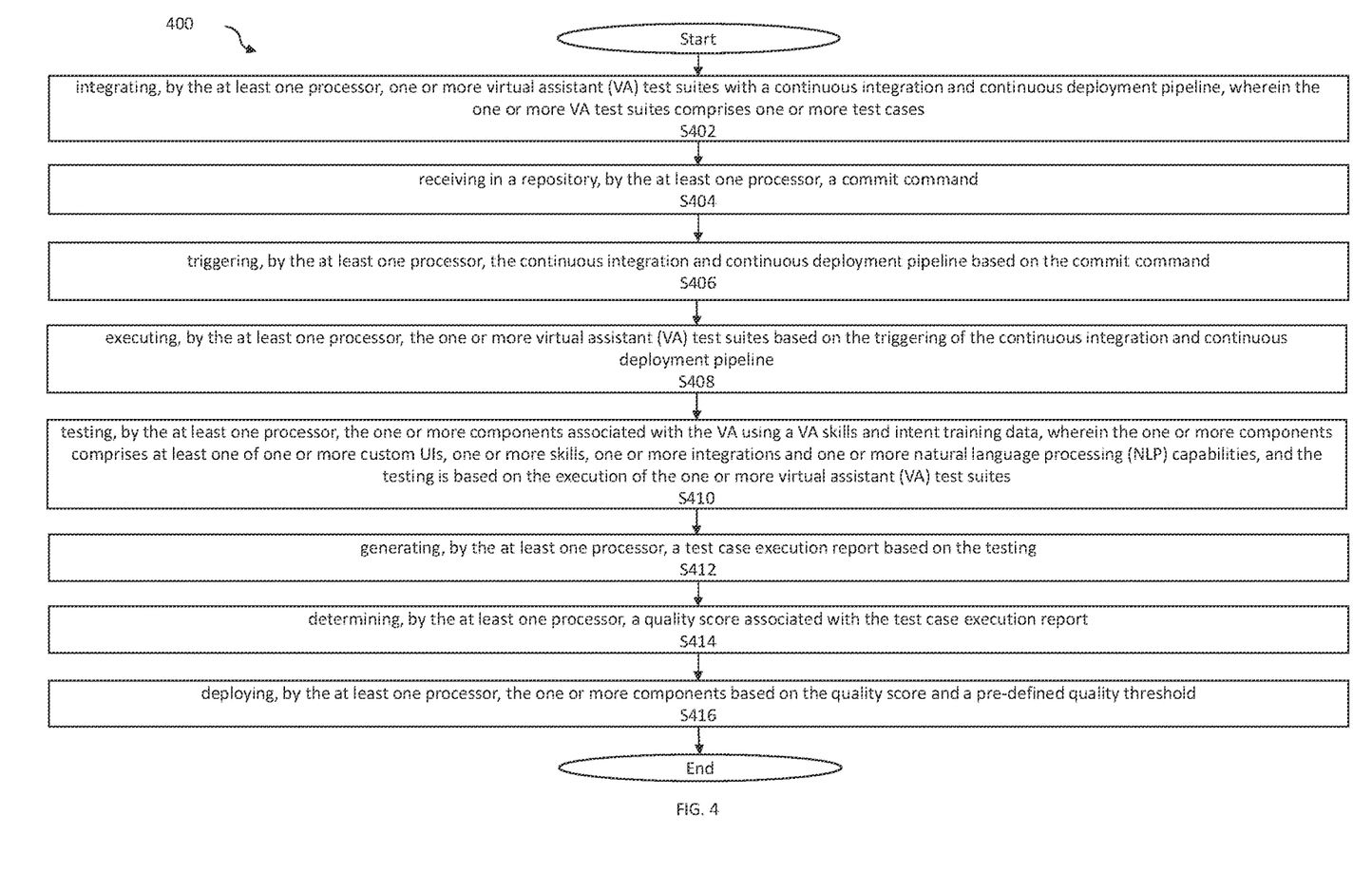
FIG. 4 is a flowchart of an exemplary process for implementing a method for providing an automated virtual assistant testing framework to test one or more components associated with a virtual assistant (VA) based on an execution of one or more virtual assistant (VA) test suites, in accordance with an exemplary embodiment.

In the process 400 of FIG. 4, at step S402, one or more virtual assistant (VA) test suites may be integrated with a continuous integration and continuous deployment pipeline by at least one processor. In an exemplary embodiment one or more virtual assistant (VA) test suites may be integrated with a continuous integration and continuous deployment (CICD) pipeline to add automation testing as the part of the CICD pipeline. The one or more virtual assistant (VA) test suites is a test suite comprising of one or more test cases which helps VA tester(s) in executing and reporting a test execution status of the one or more components associated with the virtual assistant (VA). More specifically the one or more virtual assistant (VA) test suites may comprise the one or more test cases for testing the one or more components associated with the virtual assistant (VA). Further, the one or more VA test suites may be one of a VA smoke test suite, a VA sanity test suite and a VA regression test suite, but the disclosure is not limited thereto. In an exemplary embodiment a VA smoke test suite may comprise one or more test cases for testing one or more components of a VA at a preliminary stage to identify various failures that can impact release/deployment of the one or more components of the VA. Also, in an exemplary embodiment a VA sanity test suite may comprise one or more test cases for ensuring if any changes that are made to a code relating to development of one or more components associated with a VA are working properly. Further, in an exemplary embodiment, a VA regression test suite may comprise one or more test cases to ensure if any recent code and/or any change in a code related to development of one or more components of a VA has not adversely affected any existing feature of the VA. The one or more components comprises at least one of one or more custom LTIs, one or more skills, one or more integrations and one or more natural language processing (NLP) capabilities, but the disclosure is not limited thereto. The one or more custom UIs may include one or more UI components, one or more UI control functions and/or one or more UX designs etc. Also, the one or more skills may include one or more conversation contents, one or more input elements received from user(s) and/or one or more form fields etc. In an example a conversation content may include a data related to a conversation of a user and a virtual assistant, wherein such conversation may relate to a task to be performed via the virtual assistant. Say for instance, a ticket to be created by a VA, a feedback survey to be provide by a VA, an application to be installed by a VA, etc. Also, in an example a faint field may be a field that is required to be filed by a user to instruct a virtual assistant to perform a task.

Further, the one or more integrations may include one or more integration codes for invoking one or more APIs and one or more web services, etc. The one or more natural language processing (NLP) capabilities may include at least one of one or more intents and one or more entities. In an exemplary embodiment, an intent may refer to a goal indicated in a user utterance, for example in an utterance 'book a flight from A to B', the intent is to book a flight. Further in the exemplary embodiment, the entity may refer to a modifier that may further describe or modify the intent, for example in the utterance 'book a flight from A to B', the entities may be A and B.

At step S404, a commit command may be received in a repository by the at least one processor. The repository may be bit bucket repository, but the disclosure is not limited thereto. Also, in an exemplary embodiment the commit command may be received from a developer in a testing environment such as, for example, a Framework driven test environment that is a universal, simple, fast, compatible and end to end testing environment. Further, the commit command may include a command to execute a file relating to development of the one or more components associated with the VA. In an example, a commit command may include a command to execute a code related to development of a component of a VA, say for development of a user interface of a VA to facilitate payment transactions etc. In an exemplary embodiment, the developer may create the file by using a programming language. As will be appreciated by a person of ordinary skill in the art, the programming language may include any programming language providing support for implementation of the features of the present disclosure.

At step S406, the continuous integration and continuous deployment pipeline may be triggered by the at least one processor based on the commit command. In an exemplary embodiment, a continuous integration and continuous deployment pipeline known to a person skilled in the art may be provided for the development and testing of the one or more components associated with the VA.

At step S408, the one or more virtual assistant (VA) test suites is executed by the at least one processor based on the triggering of the continuous integration and continuous deployment pipeline. In an exemplary embodiment the one or more virtual assistant (VA) test suites is executed in the Framework driven test environment. Also, in one exemplary embodiment, at least one of the VA smoke test suite, the VA sanity test suite and the VA regression test suite may be executed by the at least one processor based on the triggering of the continuous integration and continuous deployment pipeline. However, the present disclosure is not limited to the execution of the VA test suite(s) based on triggering of the CICD pipeline, and in an implementation depending on a use case the one or more virtual assistant (VA) test suites may be executed by the processor on local systems without doing a commit and without integrating with CICD.

At step S410, the one or more components associated with the VA may be tested by the at least one processor using a VA skills and intent training data. The VA skills and intent training data comprises at least one of a user utterance data and a VA skill data, but the disclosure is not limited thereto. The user utterance data may comprise a data related to utterance of a plurality of users of one or more VAs and the VA skill data comprises a data related to a plurality of skills associated with one or more VAs. Further, the testing of the one or more components by the at least one processor is based on the execution of the one or more virtual assistant (VA) test suites. Also, the testing may include one of a browser based testing and a browser less testing. In an exemplary embodiment the testing may also include a parallel execution of a plurality of test cases for the one or more components associated with the VA. The parallel execution reduces a testing time and improves the performance of the automated virtual assistant testing framework. Also, in an exemplary embodiment, the at least one processor tests at least one of the one or more custom UIs, the one or more skills, the one or more integrations and the one or more natural language processing (NLP) capabilities, etc. using the VA skills and intent training data, wherein the testing is based on the execution of the one or more virtual assistant (VA) test suites, for example, execution of one of the VA smoke test suite, the VA sanity test suite and the VA regression test suite. Further the at least one processor may test the one or more integrations using at least one of a live API endpoint and a Mock API endpoint. In some of the use cases using the Mock API endpoint provides an edge over using the live API endpoint at least due to the reason that it isolates a system under testing process and therefore it ensures that the tests are running reliably during the testing process. Also, in addition to test isolation, mocking dependent system also allows the full range of responses and scenarios to be tested without having to set up and manage a complex test infrastructure. Therefore, the mock ability of APIs provides a simplified and improved automated testing. In an exemplary embodiment the Mock API endpoint may be supported by a wire mock host and the live API endpoint may be supported by an API provider host. Further, the testing may include testing the one or more components during at least one of a development phase, a quality assurance (QA) phase, a regression phase and a user acceptance testing (UAT) phase. In an exemplary embodiment the Mock API endpoint may be integrated to the automated virtual assistant testing framework by the at least one processor to perform the testing using the integrated Mock API endpoint during at least one of the development phase, the quality assurance (QA) phase, the regression phase and the user acceptance testing (UAT) phase. The Mock API endpoint may record, manipulate and replay API responses. Also, in one of the exemplary embodiment the testing of the one or more components may include performing by the at least one processor at least one of a unit testing and an integration testing during at least one of the development phase, the QA phase, the regression phase, and the UAT phase. Further, in exemplary embodiment the testing at the development phase may include the unit testing, testing with one or more mock API endpoints, and testing of at least one of the one or more skills, the one or more natural language processing (NLP) capabilities and the one or more UI components, but the disclosure is not limited thereto. The testing at the QA phase may include testing of at least one of the one or more skills, the one or more natural language processing (NLP) capabilities and the one or more UI components etc. Also, the testing at the regression phase may include testing based on an integration of the one or more Mock API endpoints with the VA regression test suite, and testing of at least one of the one or more natural language processing (NLP) capabilities and UI benchmark, but the disclosure is not limited thereto. Further, at the UAT phase the testing may be based on an integration of the VA smoke test suite with a continuous integration and continuous deployment (CICD) pipeline that is known to a person skilled in the art. Also, in exemplary embodiment, prior to a production phase the testing may further include testing of the one or more components based on an execution of an API health check suite. Furthermore, the testing may further include testing the one or more components based on behavior of an NLP, an accessibility of a chat user interface, one or more standard guidelines such as Web Content Accessibility Guidelines (WCAG) and/or Open Web Application Security Project (OWASP) security practices etc. For example, an accessibility testing may be performed by the at least one processor to make sure the web application follows WCAG guidelines. Also in one other example the automated virtual assistant testing framework may support Dynamic Application Security Testing (DAST) of the web application for early detection of vulnerabilities and threats to make sure the conversational chat UI adheres to OWASP security practices.

Further, to generate a record of the testing of the one or more components the at least one processor may automatically capture a media, wherein the media is one of an image and a video of the execution of the one or more VA test suites. Also, at step S412, the at least one processor may generate a test case execution report based on the testing of the one or more components. In an exemplary embodiment a test case execution report may include details such as including but not limited to at least one of a number of test cases executed for the one or more components, a number of test cases passed for the one or more components, a number of test cases failed for the one or more components, a number of test cases pending for the one or more components, a number of test cases skipped for the one or more components, a duration of one or more test cases executed for the one or more components and a detail of a media captured for generating a record of the testing of the one or more components etc. Further, after generating the test case execution report the at least one processor, at step S414 may also determine a quality score associated with the test case execution report. For example if a test case execution report include details that 10 test cases are executed for the a component say for a skill associated with a VA, 8 out of 10 test cases are passed for the skill and 2 out of 10 test cases are failed for the skill. In the given example the at least one processor may determine 8 as a quality score for the test case execution report. Further, at step S416, the at least one processor may then deploy the one or more components based on the quality score and a pre-defined quality threshold. The pre-defined quality threshold may include a criteria for example a minimum quality score, required to initiate the deployment of the one or more components. Therefore if the quality score of the test case execution report is equal to or above the pre-defined quality threshold, the at least one processor may deploy the one or more components, and in case the quality score of the test case execution report is less than the pre-defined quality threshold, the at least one processor will not deploy the one or more components. For example if a quality score of a test case execution report is 8 and a pre-defined quality threshold is 7, the at least one processor will deploy the one or more components as the quality score is greater than the pre-defined quality threshold. The present disclosure therefore ensures deployment of the one or more components only if a pre-defined quality threshold criteria is met and hence a more efficient and accurate virtual assistant testing framework is provided.

Figure 5:
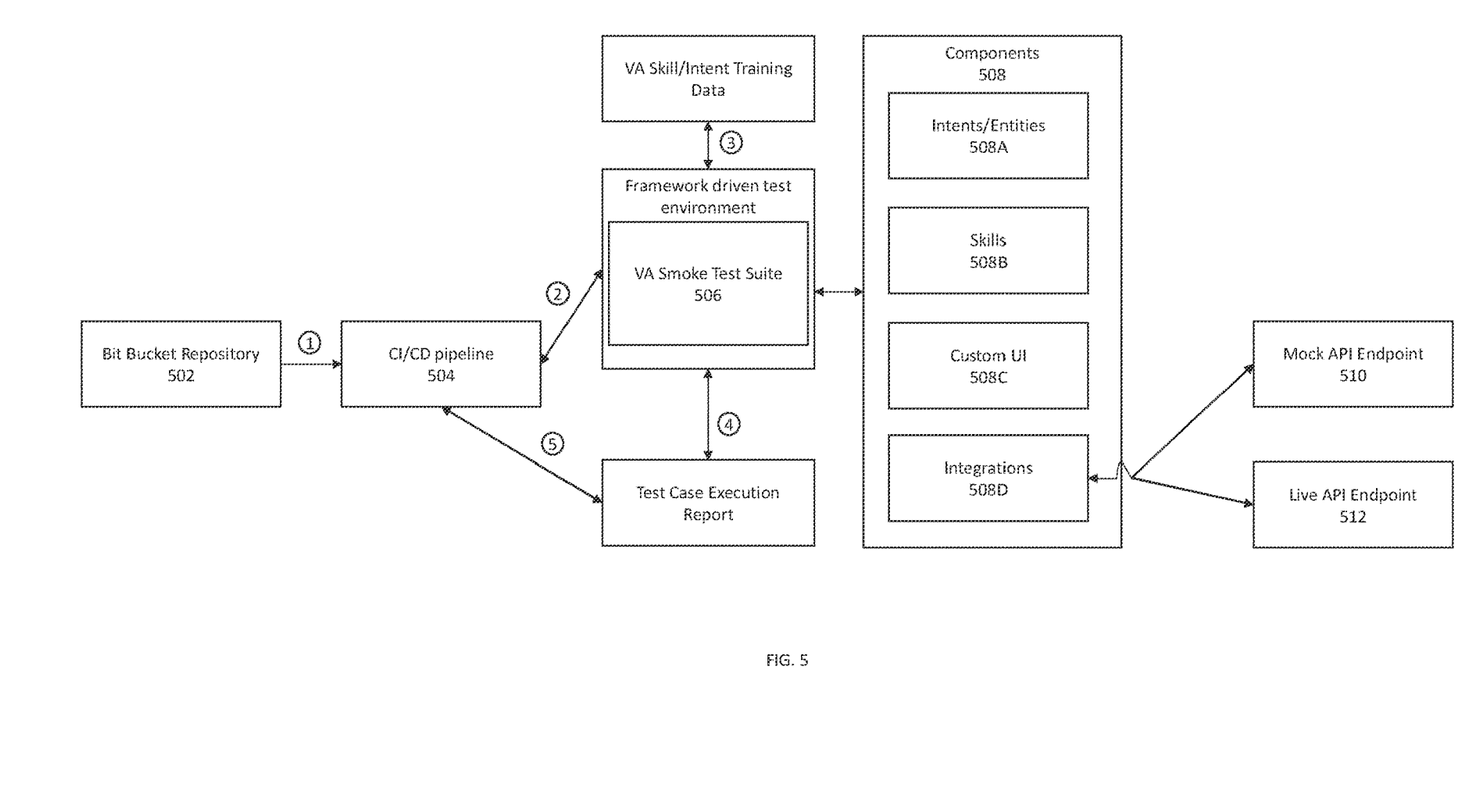
FIG. 5 is a flow diagram that illustrates an exemplary system that is usable for implementing a method for providing an automated virtual assistant testing framework to test one or more components associated with a virtual assistant (VA) based on an execution of one or more virtual assistant (VA) test suites, in accordance with an exemplary embodiment.

FIG. 5 is a flow diagram that illustrates an exemplary system that is usable for implementing a method for providing an automated virtual assistant testing framework to test one or more components associated with a virtual assistant (VA) based on an execution of one or more virtual assistant (VA) test suites, in accordance with an exemplary embodiment. The exemplary system in FIG. 5 includes a Bit Bucket repository 502, a CI/CD pipeline 504, a VA Smoke Test Suite 506, components 508 associated with a VA, a mock API endpoint 510 and a live API endpoint 512.

The Bit Bucket repository 502 receives and stores a commit command. At step 1 of FIG. 5 the commit command is provided to trigger the CI/CD pipeline 504. Further at step 2 of the FIG. 5 the VA Smoke Test Suite 506 is executed based on the triggering of the CI/CD pipeline 504. In an exemplary embodiment the VA Smoke Test Suite 506 is executed in a framework driven test environment that is known to a person skilled in the art.

At step 3 of FIG. 5, the components 508 associated with the VA are tested using a VA Skill/Intent Training Data based on the execution of the VA Smoke Test Suite 506. More particularly, at step 3 the components 508 i.e., Intents/Entities 508A, Skills 508B, Custom UI 508C and Integrations 508D are tested using the VA Skill/Intent Training Data based on the execution of the VA Smoke Test Suite 506. Furthermore, the testing of the Integrations 508D is further based on performing the testing process using at least one of the mock API endpoint 510 and a live API endpoint 512.

At step 4 of FIG. 5, a test case execution report is generated based on the testing of the components 508. Further, a quality score associated with the test case execution report is determined to deploy the one or more components based on the quality score and a pre-defined quality threshold.

At step 5 of FIG. 5, the one or more components are deployed based on the quality score and the pre-defined quality threshold. More particularly the one or more components are deployed in an event the quality score of the test case execution report is equal to or greater than the pre-defined quality threshold.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing an automated virtual assistant testing framework to test one or more components associated with a virtual assistant (VA), the method being implemented by at least one processor, the method comprising:
   integrating, by the at least one processor, one or more virtual assistant (VA) test suites with a continuous integration and continuous deployment pipeline, wherein the one or more VA test suites comprises one or more test cases, wherein the VA test suites include a VA smoke test suite, a VA sanity test suite and a VA regression test suite, wherein the VA smoke test suite includes test cases for testing one or more components of a VA at a preliminary stage to identify various failures that can impact release/deployment of the one or more components of the VA, wherein the VA sanity test suite includes one or more test cases for ensuring whether any changes that are made to a code relating to development of one or more components associated with a VA are working properly, and wherein the VA regression test suite includes one or more test cases to ensure whether any recent code and/or any change in a code related to development of one or more components of a VA has not adversely affected any existing feature of the VA;
   receiving in a repository, by the at least one processor, a commit command;
   triggering, by the at least one processor, the continuous integration and continuous deployment pipeline based on the commit command;
   executing, by the at least one processor, the one or more virtual assistant (VA) test suites based on the triggering of the continuous integration and continuous deployment pipeline;
   testing, by the at least one processor, the one or more components associated with the VA using a VA skills and intent training data, wherein the one or more components comprises at least one of one or more custom Uls, one or more skills, one or more integrations and one or more natural language processing (NLP) capabilities, and the testing is based on the execution of the one or more virtual assistant (VA) test suites;
   generating, by the at least one processor, a test case execution report based on the testing;
   determining, by the at least one processor, a quality score associated with a number of test cases passed the testing greater than a number of test cases failed the testing in the test case execution report; and
   deploying, by the at least one processor, the one or more components based on the quality score is equal or above a pre-defined quality threshold.

2. The method according to claim 1, wherein the testing of the one or more integrations further comprises:
   testing, by the at least one processor, the one or more integrations using at least one of a live API endpoint and a Mock API endpoint.

3. The method according to claim 1, wherein the testing includes at least one of a:
   browser based testing and a browser less testing,
   parallel execution of a plurality of test cases for the one or more components associated with the VA, and
   testing during at least one of a development phase, a quality assurance (QA) phase, a regression phase and a user acceptance testing (UAT) phase.

4. The method according to claim 3, further comprising:
   integrating, by the at least one processor, the Mock API endpoint to the automated virtual assistant testing framework to perform the testing using the integrated Mock API endpoint.

5. The method according to claim 3, wherein the testing further comprises performing, by the at least one processor, at least one of a unit testing and an integration testing during at least one of the development phase, the QA phase, the regression phase, and the UAT phase.

6. The method according to claim 1, further comprising:
   automatically capturing, by the at least one processor, a media to generate a record of the testing, wherein the media is one of an image and a video of the execution of the one or more VA test suites.

7. The method according to claim 1, wherein the one or more natural language processing (NLP) capabilities further includes at least one of one or more intents and one or more entities.

8. The method according to claim 1, wherein the testing further includes testing based on one or more standard guidelines.

9. A computing device configured to implement an execution of a method for providing an automated virtual assistant testing framework to test one or more components associated with a virtual assistant (VA), the computing device comprising:
   a processor;
   a memory; and
   a communication interface coupled to each of the processor and the memory, wherein the processor is configured to:
      integrate, one or more virtual assistant (VA) test suites with a continuous integration and continuous deployment pipeline, wherein the one or more VA test suites comprises one or more test cases, wherein the VA test suites include a VA smoke test suite, a VA sanity test suite and a VA regression test suite, wherein the VA smoke test suite includes test cases for testing one or more components of a VA at a preliminary stage to identify various failures that can impact release/deployment of the one or more components of the VA, wherein the VA sanity test suite includes one or more test cases for ensuring whether any changes that are made to a code relating to development of one or more components associated with a VA are working properly, and wherein the VA regression test suite includes one or more test cases to ensure whether any recent code and/or any change in a code related to development of one or more components of a VA has not adversely affected any existing feature of the VA;

receive in a repository a commit command;

trigger, the continuous integration and continuous deployment pipeline based on the commit command;

execute, the one or more virtual assistant (VA) test suites based on the triggering of the continuous integration and continuous deployment pipeline;

test, the one or more components associated with the VA using a VA skills and intent training data, wherein the one or more components comprises at least one of one or more custom UIs, one or more skills, one or more integrations and one or more natural language processing (NLP) capabilities, and the testing is based on the execution of the one or more virtual assistant (VA) test suites;

generate, a test case execution report based on the testing, determine a quality score associated with a number of test cases passed the testing greater than a number of test cases failed the testing in the test case execution report, and deploy, the one or more components based on the quality score is equal or above a pre-defined quality threshold.

10. The computing device according to claim 9, wherein, to test the one or more integrations, the processor is further configured to:

test, the one or more integrations using at least one of a live API endpoint and a Mock API endpoint.

11. The computing device according to claim 9, wherein the testing includes one of a:

browser based testing and a browser less testing, parallel execution of a plurality of test cases for the one or more components associated with the VA, and testing during at least one of a development phase, a quality assurance (QA) phase, a regression phase and a user acceptance testing (UAT) phase.

12. The computing device according to claim 10, wherein the processor is further configured to:

integrate, the Mock API endpoint to the automated virtual assistant testing framework to perform the testing using the integrated Mock API endpoint.

13. The computing device according to claim 10, wherein for the testing the processor is further configured to perform at least one of a unit testing and an integration testing during at least one of the development phase, the QA phase, the regression phase, and the UAT phase.

14. The computing device according to claim 9, wherein the processor is further configured to:

automatically capture, a media to generate a record of the testing, wherein the media is one of an image and a video of the execution of the one or more VA test suites.

15. The computing device according to claim 9, wherein the one or more natural language processing (NLP) capabilities further includes at least one of one or more intents and one or more entities.

16. The computing device according to claim 9, wherein the testing further includes testing based on one or more standard guidelines.

17. A non-transitory computer readable medium configured to store instructions for providing an automated virtual assistant testing framework to test one or more components associated with a virtual assistant (VA), wherein, when executed, the instructions cause a processor to perform the following:

integrating one or more virtual assistant (VA) test suites with a continuous integration and continuous deployment pipeline, wherein the one or more VA test suites comprises one or more test cases, wherein the VA test suites include a VA smoke test suite, a VA sanity test suite and a VA regression test suite, wherein the VA smoke test suite includes test cases for testing one or more components of a VA at a preliminary stage to identify various failures that can impact release/deployment of the one or more components of the VA, wherein the VA sanity test suite includes one or more test cases for ensuring whether any changes that are made to a code relating to development of one or more components associated with a VA are working properly and wherein the VA regression test suite includes one or more test cases to ensure whether any recent code and/or any change in a code related to development of one or more components of a VA has not adversely affected any existing feature of the VA;

receiving in a repository, a commit command;

triggering the continuous integration and continuous deployment pipeline based on the commit command;

executing the one or more virtual assistant (VA) test suites based on the triggering of the continuous integration and continuous deployment pipeline; testing the one or more components associated with the VA using a VA skills and intent training data, wherein the one or more components comprises at least one of one or more custom UIs, one or more skills, one or more integrations and one or more natural language processing (NLP) capabilities, and the testing is based on the execution of the one or more virtual assistant (VA) test suites;

generating, by the at least one processor, a test case execution report based on the testing;

determining, by the at least one processor, a quality score associated with a number of test cases passed the testing greater than a number of test cases failed the testing the test case execution report; and deploying, by the at least one processor, the one or more components based on the quality score is equal or above a pre-defined quality threshold.

* * * * *

UNITED STATES PATENT AND TRADEMARK OFFICE
CERTIFICATE OF CORRECTION

| | | |
|---|---|---|
| PATENT NO. | : 12,174,731 B2 | Page 1 of 1 |
| APPLICATION NO. | : 17/874674 | |
| DATED | : December 24, 2024 | |
| INVENTOR(S) | : Shreyas Hiremath et al. | |

It is certified that error appears in the above-identified patent and that said Letters Patent is hereby corrected as shown below:

On the Title Page

Column 1, item (72) Inventors which reads:
"(72) Inventors: Shreyas Hiremath, Bengaluru (IN);
　　　　　　　Raghava Krishna Gorantla Satyanarayana, Bangalore (IN);
　　　　　　　Vrushank Vijayakumar, New York, NY (US)"

Should read:
-- "(72) Inventors: Shreyas Hiremath, Bengaluru (IN);
　　　　　　　Raghava Krishna Gorantla Satyanarayana, Bangalore (IN);
　　　　　　　Vrushank Vijayakumar, Mysore (IN)" --

Signed and Sealed this
First Day of April, 2025

Coke Morgan Stewart
*Acting Director of the United States Patent and Trademark Office*